(12) United States Patent
Hughes et al.

(10) Patent No.: US 6,625,425 B1
(45) Date of Patent: Sep. 23, 2003

(54) LATCHING ASSEMBLY FOR A MODULE COVER OF A WIRELESS COMMUNICATION DEVICE

(75) Inventors: Michael J. Hughes, Neshanic Station, NJ (US); Ningsheng Zhu, Whippany, NJ (US)

(73) Assignee: Motorola, Inc., Schaumburg, IL (US)

( * ) Notice: Subject to any disclaimer, the term of this patent is extended or adjusted under 35 U.S.C. 154(b) by 530 days.

(21) Appl. No.: 09/667,979

(22) Filed: Sep. 22, 2000

(51) Int. Cl.[7] ................................................. H04B 1/38
(52) U.S. Cl. ........................... 455/90; 455/575; 455/351
(58) Field of Search ........................... 455/90, 575, 351; 361/601, 615, 616, 679, 814; 379/433.08; 320/114; 429/96–100

(56) References Cited

U.S. PATENT DOCUMENTS

| | | | | |
|---|---|---|---|---|
| 4,912,602 A | * | 3/1990 | Zurek et al. | 361/752 |
| 5,314,763 A | * | 5/1994 | Aksoy et al. | 429/97 |
| 5,586,184 A | * | 12/1996 | Piper | 379/433.08 |
| 5,857,148 A | * | 1/1999 | Weisshappel et al. | 455/90 |
| 5,960,332 A | * | 9/1999 | Michalzik | 455/90 |
| 6,212,366 B1 | * | 4/2001 | Cheraso et al. | 455/90 |

\* cited by examiner

*Primary Examiner*—Lee Nguyen
*Assistant Examiner*—Tuan Tran
(74) *Attorney, Agent, or Firm*—Shigeharu Furukawa; Hisashi D. Watanabe (57) ABSTRACT

This invention is a wireless communication device (100) that includes a housing (102) and a compartment (202) accessible from one side of the housing. The device also includes a compartment cover (212) that has a covering position over the compartment and a latching assembly (214) that is supported by the housing. The latching assembly is capable of receiving an end portion (216) of the compartment cover such that the latching assembly requires less interactive force to receive the end portion than to release the end portion. In addition, the latching assembly includes an inner component (404) positioned adjacent to the housing and an outer component (402) positioned adjacent to the inner component. The inner component moves together with the outer component to release the end portion of the compartment cover and moves separate from the outer component to receive the end portion of the compartment cover.

23 Claims, 6 Drawing Sheets

LATCHING ASSEMBLY FOR A MODULE COVER OF A WIRELESS COMMUNICATION DEVICE

FIELD OF THE INVENTION

The present invention relates generally to the field of wireless communication devices having inner compartments for housing removable modules. In particular, the present invention relates to a latch mechanism of a wireless communication device for securing a cover over a battery compartment of the device.

BACKGROUND OF THE INVENTION

Wireless communication devices, such as portable radiotelephones, pagers, and personal digital assistants ("PDA's"), often have inner compartments to hold removable batteries. These devices permit a user to access the inner compartment by removing a battery cover positioned over the inner compartment. Battery covers are usually located on the back of a wireless communication device since they are not accessed during general use of the device. The user may remove the battery cover of a particular device to remove an old or depleted battery installed in the inner compartment and/or to install a new or charged battery in the inner compartment. The battery cover must be re-attached to securely retain the battery in the inner compartment and prevent foreign matter from entering the inside of the device.

Battery covers of wireless communication devices have support arms and latching assemblies to secure them over the inner compartments. Support arms hold a battery cover against a device so long as the battery cover is retained at a particular position over the device's inner compartment. A latching assembly will secure the battery cover at the particular position and, in addition, may provide additional support to hold the battery cover against the device. Thus, a user may secure a battery cover to a device by positioning its support arms against the device and securing one end of the battery cover to a latching assembly of the device.

Latching assemblies are typically push-button assemblies accessible from the back of a wireless communication device. In particular, a button of the push-button assembly is depressed to release the battery cover and dislodge it from the support arms of the device. To re-attach the battery cover to the device, the battery cover lodges into the support arms and slides back into the latching assembly. As the battery cover slides into the push-button assembly, the assembly automatically snaps over one end of the battery cover to retain it therein.

It is important for a battery cover to securely attach to the housing of a wireless communication device so that the battery is retained in the inner compartment and foreign matter does not enter the inside of the device. A loose battery or intruding foreign matter may cause the wireless communication device to lose power or otherwise malfunction. Wireless communication devices are particularly susceptible to such potential problems since their sensitive electronic components are often bumped and jostled by normal operation and transport. At the same time, it is highly desirable for the latching assembly and battery cover of a device to be easy to open by a user so that the task of replacing a battery is not cumbersome. Accordingly, a latching assembly of a wireless communication device must permit a battery cover to be easily attached to its housing but not as easy to detach there from.

DETAILED DESCRIPTION OF THE PREFERRED EMBODIMENTS

The present invention is a wireless communication device that includes a housing and a compartment accessible from one side of the housing. The device also includes a compartment cover that has a covering position over the compartment and a latching assembly that is supported by the housing. The latching assembly is capable of receiving an end portion of the compartment cover such that the latching assembly requires less interactive force to receive the end portion than to release the end portion. In addition, the latching assembly includes an inner component positioned adjacent to the housing and an outer component positioned adjacent to the inner component. The inner component moves together with the outer component to release the end portion of the compartment cover and moves separate from the outer component to receive the end portion of the compartment cover.

Figure 1:
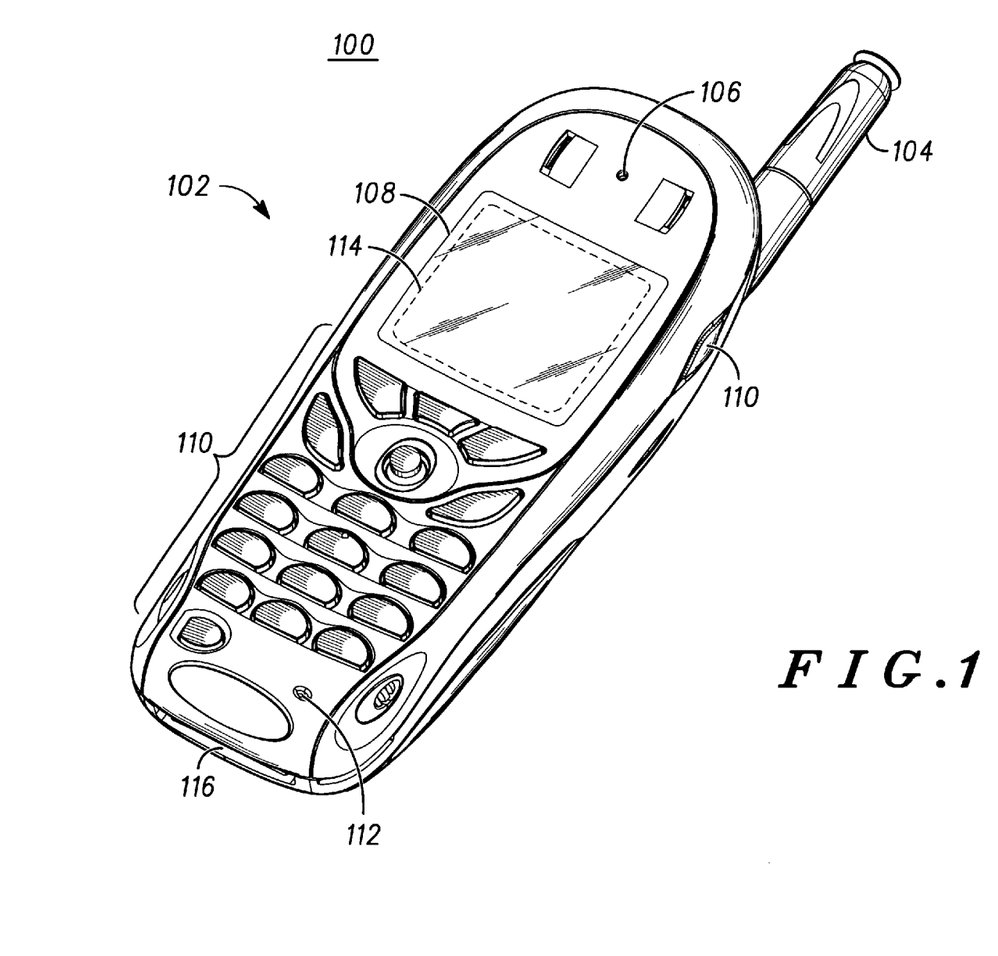
FIG. 1 is a frontal perspective view of a preferred embodiment of the present invention.

The wireless communication device of the present invention is generally shown in FIG. 1 to be a radiotelephone 100, preferably a cellular telephone operable in a cellular telephone system. Although the radiotelephone 100 is preferably a cellular telephone, one skilled in the art will recognize that the features discussed herein below will also find application in other wireless communication devices such as cordless telephones, wireline telephones, personal digital assistants ("PDA's"), two-way radios, pagers, and the like, and radiotelephones described herein shall refer to each of these and their equivalents.

Referring to FIG. 1, the radiotelephone 100 includes a housing 102 and an antenna 104 extending from an upper portion of the housing. The housing includes a speaker aperture 106, a display lens 108, a user interface 110 and microphone aperture 112. The speaker aperture 106 directs audible sounds produced by an internal speaker (not shown) to the outside of the housing 102. The display lens 108 is a transparent surface that covers a display 114 of the radiotelephone. The display 114 is coupled to an internal electrical circuit (not shown) of the radiotelephone 100 and receives electrical output signals from the electrical circuit. The user interface 110 is also coupled to the internal electrical circuit of the radiotelephone 100 and provides electrical input signals to the electrical circuitry in response to touch or contact by an external object, such as a user's finger. The microphone aperture 112 directs audible sounds from the outside of housing 102 to an internal microphone (not shown). In addition, an external connector 116 is located at a lower portion of the housing 102 for interfacing various accessories to the radiotelephone 100, such as a power adapter, car kit, earpiece/microphone attachment, cable attachment to a computer, and the like.

In addition to the display 114 and user interface 110 described above, the other electrical components are connected, directly or indirectly, to the internal electrical circuit of the radiotelephone 100 including, but not limited to, the antenna 104, the speaker located under the speaker aperture 106, the internal microphone located under the microphone aperture 112, and the external connector 116. Therefore, to perform the general wireless communication functions of a wireless communication device, the electrical circuit of the radiotelephone 100 includes a transceiver circuit for transmission and reception of communication signals within a wireless communication system.

Figure 2:
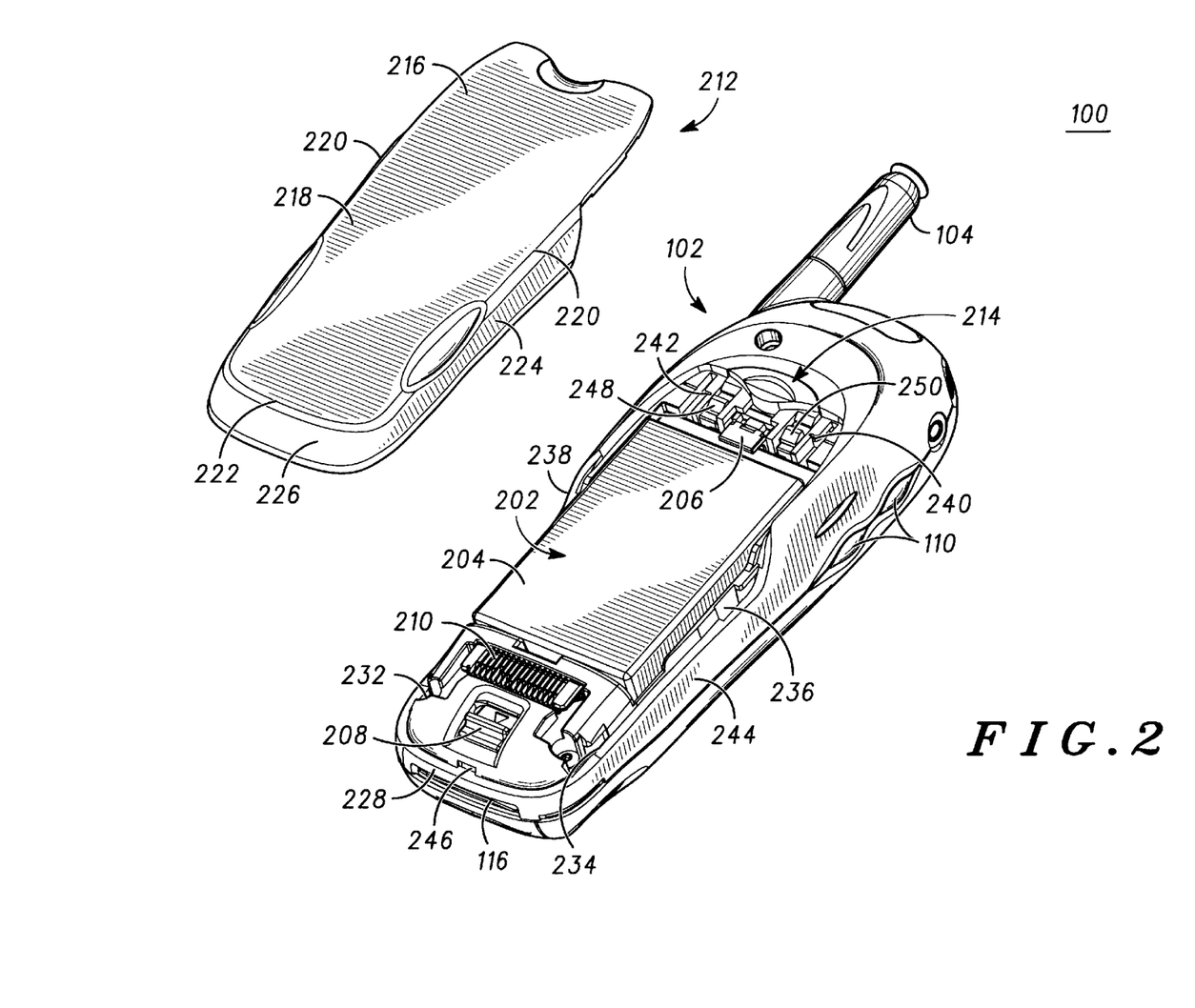
FIG. 2 is a rear exploded perspective view of the preferred embodiment of FIG. 1 including a battery cover, a battery compartment and a latching assembly for fastening the battery cover over the battery compartment.

Referring to FIG. 2, the housing 102 further includes a compartment 202 that is capable of receiving a removable module 204. The removable module 204 may be any type of component that must be accessible by a user from time-to-time such as a power source, SIM card, memory module, accessory connector and the like. For the preferred embodiment, the removable module is a power source or, more specifically, a battery. The primary function of the power source 204 of the preferred embodiment is to provide electrical power to the electrical circuit, including the transceiver circuit, of the radiotelephone 100. A battery bracket 206 in the compartment 202 holds one end of the power source 204, and a battery latching mechanism 208 holds the other end of the power source. Also, the compartment 202 may have more than one removable module 204 positioned therein. For example, the preferred embodiment shown in FIG. 2 includes a peripheral connector 210 that is the portion of the electrical circuit of the radiotelephone 100 that may couple to other removable modules positioned in the compartment 202 with the power source 204 or built-in to a compartment cover. Examples of such removable modules include E-commerce modules, Bluetooth modules, personal digital assistant ("PDA") modules, music modules and the like.

As shown in FIG. 2, the radiotelephone 100 also includes a compartment cover 212 having a covering position over the compartment 202 and a latching assembly 214 supported by the housing 102. The cover 212 is a substantially planar, rigid part that is, preferable, made of a material that blends with the remainder of the housing 102. The cover 212 includes an upper end portion 216 and a lower end portion 218 continuous with the upper end portion that has peripheral edges formed at its lateral sides 220 and lower side 222, namely a lateral peripheral edge 224 and lower peripheral edge 226. Unlike the lower end portion 218, the upper end portion 216 does not include peripheral edges.

Figure 3:
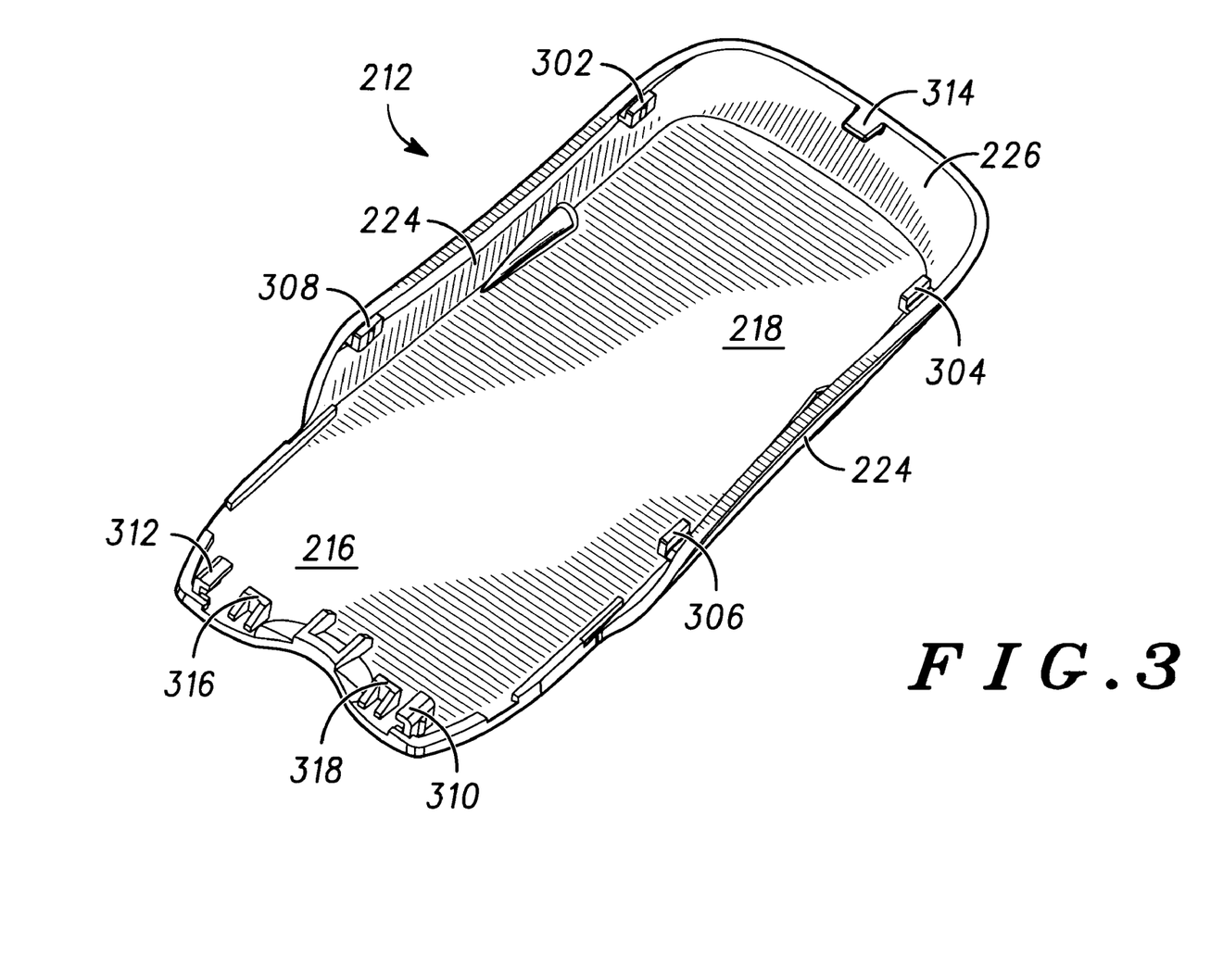
FIG. 3 is an inner perspective view of the battery cover of FIG. 2.

Referring to FIG. 3 in conjunction with FIG. 2, the cover 212 is dropped over the compartment 202 such that the lower side 222 and the lower peripheral edge 226 hang beyond a lower end 228 of the housing 102 to position the cover on the housing 102. During this step, the lateral support arms 302, 304, 306, 308, 310, 312 of the cover 212 are set within receiving grooves 232, 234, 236, 240, 242 of the housing 102. For the preferred embodiment shown in FIGS. 2 and 3, a first lateral support arm 302 is inserted into a first receiving groove 232, a second lateral support arm 304 is inserted into a second receiving groove 234, and a third lateral support arm 306 is inserted into a third receiving groove 236. A fourth receiving groove for receiving the fourth lateral support arm 308 is not shown in the figures, but has the same form as the third receiving groove 236 and is situated on the opposite side of the housing 102. Similarly, a fifth lateral support arm 310 and a sixth lateral support arm 312 of the cover 212 are positioned within a fifth receiving slot 240 and a sixth receiving slot 242, respectively.

After setting the cover 212 at the above position (in which the lower peripheral edge 226 hangs beyond the lower end 228), the cover may slide over the compartment 202 to a covering position so that the lateral peripheral edge 224 and the lower peripheral edge 226 line-up with the sides 244 and the lower end 228, respectively. Each lateral support arm 302, 304, 306, 308, 310, 312 is positioned within its respective receiving groove 232, 234, 236, 240, 242 so that there is minimal lateral movement of the cover 212 relative to the housing 102. Also, when the cover 212 is positioned at the covering position, inner faces of the lateral support arms 302, 304, 306, 308, 310, 312 abut inner faces of the receiving groove 232, 234, 236, 240, 242 to prevent the cover from being pulled outward away from the housing 102. To further restrict movement of the cover 212 relative to housing 102, a planar plug 314, located on the lower peripheral edge 226 of the cover, is positioned in a receiving slot 246 located at the lower end 228 of the housing. Accordingly, when the cover 212 is at the covering position, the lateral support arms 302, 304, 306, 308, 310, 312 and the receiving grooves 232, 234, 236, 240, 242 permit the cover to move only in one direction, i.e. downward the lower end 228 of the housing 102 such that the lower peripheral edge 226 extends beyond the lower end.

To secure the cover 212 to the covering position, the latching assembly 214 receives the upper end portion 216 as the cover 212 slides toward the covering position. In particular, the latch assembly 214 includes one or more latch protrusions 248, 250 that latch with one or more cover protrusions 316, 318 located on the upper end portion 216. Accordingly, when the cover 212 is at the covering position, the latching assembly 214 prevents the cover from moving in the one and only direction permitted by the lateral support arms 302, 304, 306, 308, 310, 312 and the receiving grooves 232, 234, 236, 240, 242 described above.

Figure 4:
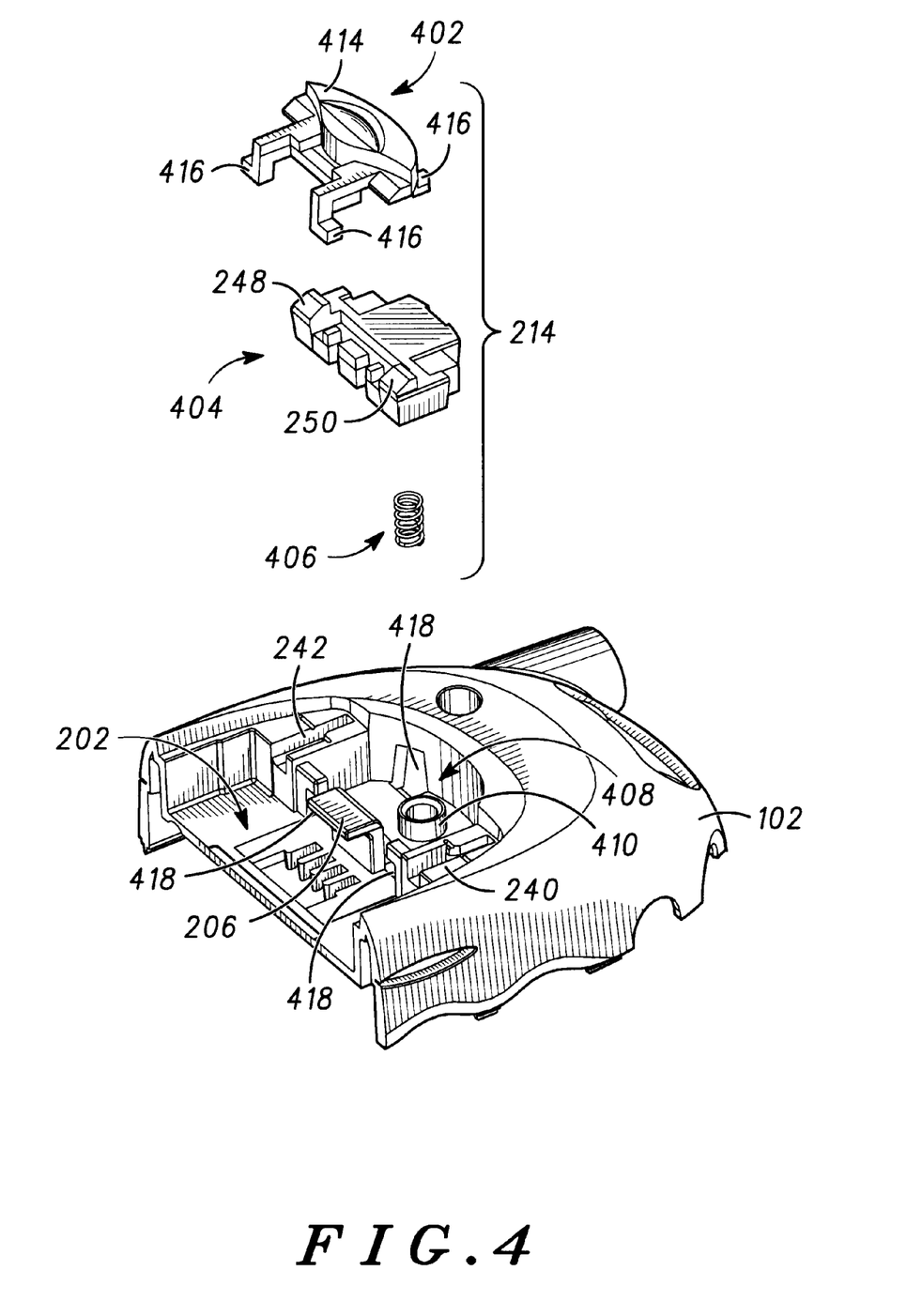
FIG. 4 is an exploded perspective view of the upper rear portion of the preferred embodiment of FIG. 2.
Figure 5:
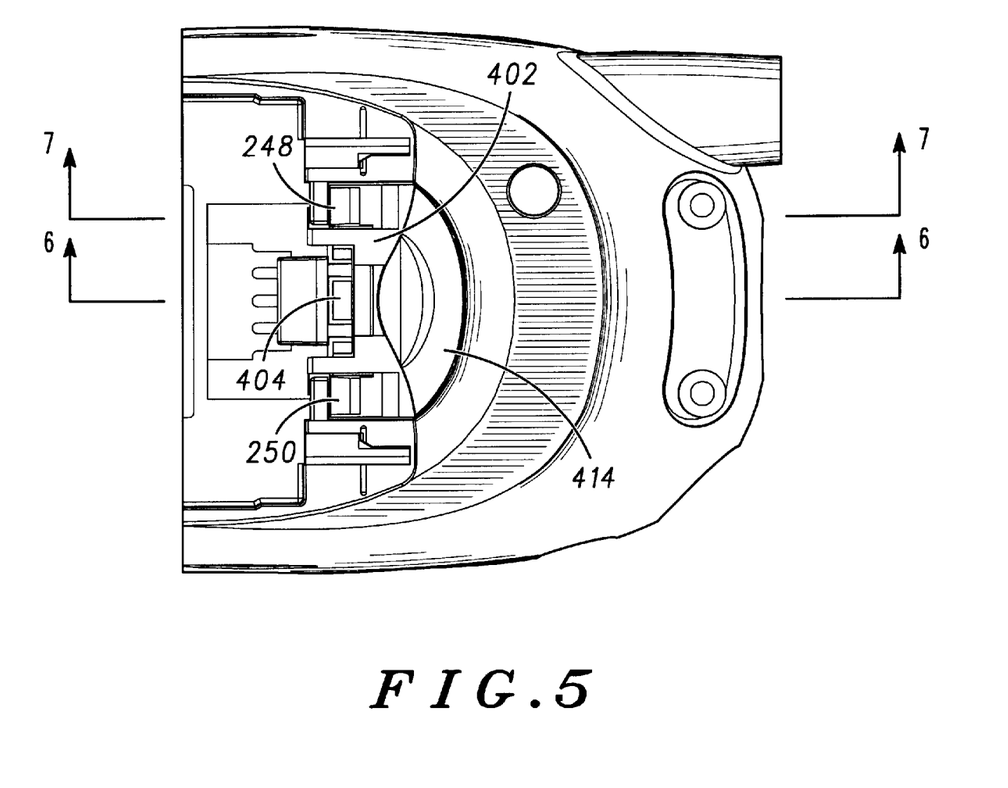
FIG. 5 is a top planar view of the upper rear portion of the preferred embodiment of FIG. 4 in which the upper rear portion is assembled.
Figure 6:
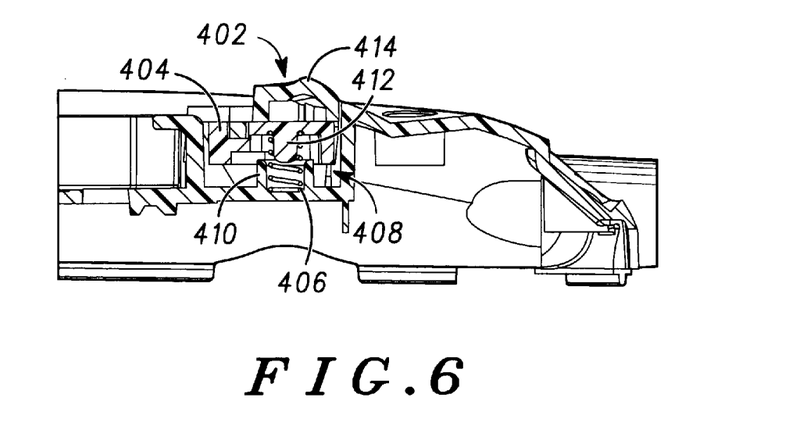
FIG. 6 is a sectional view of the upper rear portion of the preferred embodiment of FIG. 5 taken along line 6—6.

Referring to FIG. 4, the latching assembly 214 includes an outer component 402, an inner component 404 and a spring mechanism 406 that are positioned within a chamber 408 of the housing 102. For the preferred embodiment, the outer component 402 is a push-button mechanism, the inner component 404 is a floating block, and the spring mechanism 406 is a resilient metallic spring. The spring mechanism 406 of the latching assembly 214 effectively biases the latching assembly away from the housing 102. One end of the spring mechanism 406 is situated in a cylindrical well 410 at the base of the chamber 408, and the other end of the spring mechanism is situated around a pin 412 at the bottom surface of the inner component 404. As shown in FIG. 6, the cylindrical well 410 is positioned on the housing 102 and the pin 412 is positioned on the inner component 404 so that the spring mechanism 406 is offset from the midpoint between the inner walls of the chamber 408. More importantly, the spring mechanism 406 offset from the latch protrusions 248, 250 of the inner component or, in other words, the spring mechanism is not located directly under the latch protrusions.

The inner component 404 has an outer periphery that is substantially similar in shape to the inner walls of the chamber 408 so that the inner component generally moves along one axis, specifically the inner component generally moves toward or away from the base of the chamber 408. However, there is sufficient spacing between the outer periphery of the inner component and the inner wall of the chamber 408 so that the inner component may rotate, pivot or tilt slightly within the chamber.

The outer component 402 includes a button 414 and four extending supports 416. The outer component 402 is positioned above and around the inner component 404 when situated in the chamber 408. The four extending supports 416 of the outer component 402 surround the inner component 404 to keep them with each other. The outer component 402 interlocks with the inner component 404 in the horizontal direction, and the four extending supports 416 interlock with the chamber 408 in the horizontal direction. Accordingly, the outer component 402, the inner component 404 and the chamber 408 do not move relative to each other in the horizontal direction.

The four extending supports 416 of the outer component 402 fit within four corresponding vertical channels 418 situated about the chamber 408 to permit the outer component 402 to move vertically therein. Accordingly, the inner component 404 may move relative to the outer component 402 in the vertical direction, and the outer component may move relative to the chamber 408 in the vertical direction. Only three of the extending supports 416 and corresponding vertical channels 418 are shown in FIG. 4, but the fourth extending support and corresponding vertical channel is substantially similar to the other three. Also, as shown in FIG. 6, the button 414 is position directly over the spring mechanism 406 and offset from the latch protrusions 248, 250 of the inner component 404.

Figure 7:
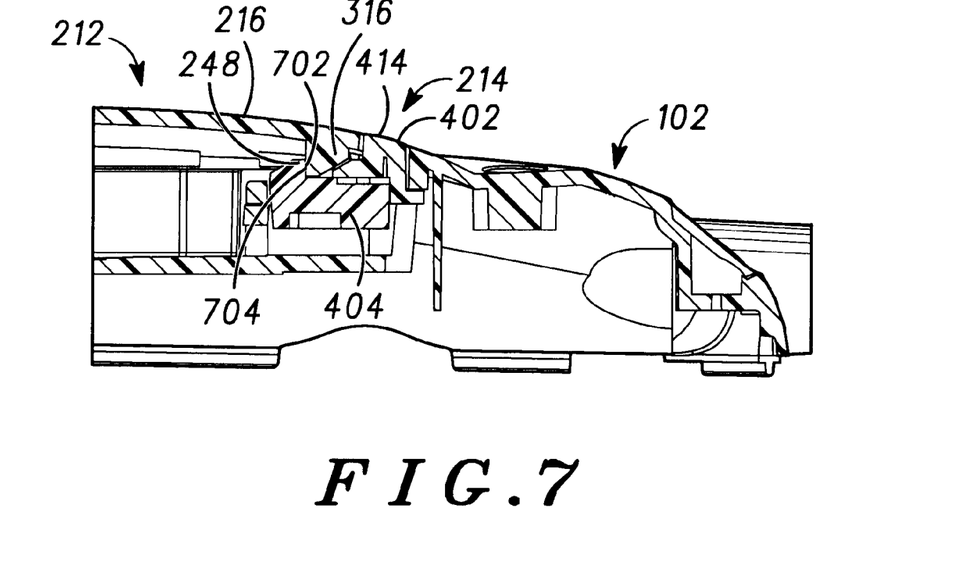
FIG. 7 is a sectional view of the upper rear portion of the preferred embodiment of FIG. 5 taken along line 7—7 in which the battery cover (which has been added) has engaged the latching assembly.

Referring to FIG. 7, the latching assembly 214 is capable of retaining the upper end portion 216 of the compartment cover 212 at the covering position shown. At this position an abutting surface 702 of the cover protrusion 316 abuts an abutting surface 704 of the latch protrusion 248. Accordingly, the cover 212 cannot move against the inner component 404 and, thus, the cover is locked or secured to the latching assembly 214.

Figure 8:
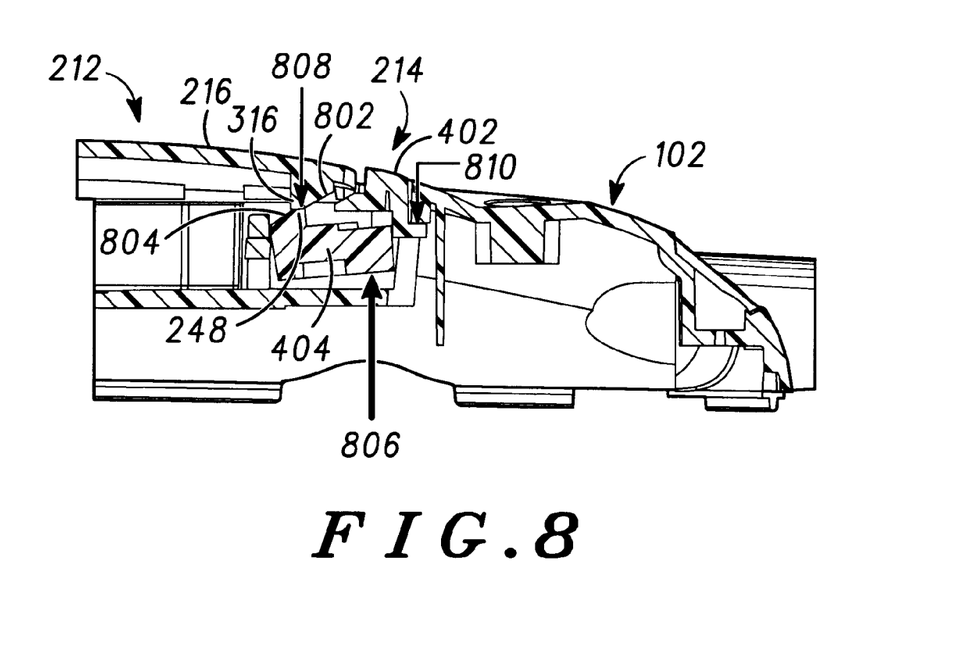
FIG. 8 is a sectional view of the upper rear portion of the preferred embodiment of FIG. 7 in which the battery cover is engaging the latching assembly.

Referring to FIG. 8, the latching assembly 214 is capable of receiving the upper end portion 216 of the compartment cover 212 such that the latching assembly requires less interactive force to receive the end portion than to release the end portion. As shown in FIG. 8, a force 806 represents the force applied to the inner component 404 by the spring mechanism 406. In order to move the inner component 404 away from the path of travel of the compartment cover 212 or, more particular, move the latch protrusion 248 away from the path of travel of the cover protrusion 316, a force greater than force 806 must be subjected to outer component 402. The outer component 402 shall, in turn, transfer this force to the inner component 404 to compress the spring mechanism 406 and move the latch protrusion 248 away from the cover protrusion 316. Accordingly, the outer component 402 and the inner component 404 shift together downward in a parallel direction relative to the housing 102 at a force greater than force 806 to release the upper end portion 216 from the latching assembly 214.

In contrast to shifting the inner component 404 to release the upper end portion 216, the inner component 404 rotates at an angle relative to the housing 102 when the inner component receives the upper end portion. Also, the inner component 404 rotates independently, i.e. separate from the outer component 402. For the preferred embodiment, the outer component 402 has minimal movement when the inner component 404 receives the upper end portion 216. As shown in FIG. 8, forces 808 and 810 of the inner component 404 and the outer component 402 counter the force 806 of the spring mechanism 406. As the cover 212 moves to the covering position, an angled surface 802 of the cover protrusion 316 passes over an angled surface 804 of the latch protrusion 248. During this step, the cover protrusion 316 presses downward on the latch protrusion, thus subjecting it to force 808. At the same time, the outer component 402 remains in partial contact with the inner component 404 and, thus, subjects it to force 810. Since a user would merely position the cover 212 over the compartment 202 and does not need to maintain the outer component 402, the user would only need to apply a force greater than force 808 to permit the latching assembly 214 to receive the upper end portion 216 as opposed to applying a force greater than force 806 to permit the latching assembly to release the upper end portion.

The spring mechanism 406 is subjected to a partial compression when the inner component 404 of the latching assembly 214 receives the upper end portion 216 of the cover 212, whereas the spring mechanism is subjected to a substantial compression when the inner component releases the end portion. The substantial compression is greater than the partial compression since the inner component 404 is merely rotating instead of shifting when the inner component receives the upper end portion 216.

Therefore, by permitting the inner component 404 to rotate, the latching assembly 214 is able to counter and overcome force 806 of the spring mechanism 406 with force 808 of the component cover 212 and force 810 of the outer component 402. Both forces 808 and 810 are directed towards force 806 through the inner component 404. For this reason, the latching assembly 214 requires less interactive force to receive the end portion 216 than to release the end portion.

Furthermore, the two-component structure of the present invention permits flexibility in choosing the materials for the latching assembly 214. The outer component 402 and the inner component 404 are not flexed or otherwise subjected to stress, particularly during assembly. The outer component 402 may be made of any type of material that would be aesthetically pleasing to view from the outside of the radiotelephone 100. For example, the outer component 402 may be painted since it will not be flexed or otherwise stressed in ways that would ruin a painted coating. The inner component 404 may be made of any type of material that would provide for smooth operation of receiving and releasing the component cover 212. For example, the inner component 404 may be coated with a chemical additive for smooth sliding of the latch protrusion 248 with the cover protrusion 316. Accordingly, the present invention provides clear advantages over prior art latching mechanisms having parts that flex.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A wireless communication device comprising:
    a housing having a compartment accessible from at least one side of said housing;
    a compartment cover including an end portion, said compartment cover having a covering position over said compartment; and
    a latching assembly supported by said housing, said latching assembly including an inner component and being effective to receive said end portion of said compartment cover, said latching assembly requiring less interactive force to receive said end portion than to release said end portion,
    wherein said end portion of said compartment cover is effective to rotate said inner component when said latching assembly receives said end portion.

2. The wireless communication device of claim 1, wherein said latching assembly includes an inner component, said inner component rotates when said latching assembly receives said end portion of said compartment cover, and said inner component shifts when said latching assembly releases said end portion of said compartment cover.

3. The wireless communication device of claim 2, wherein said inner component rotates at an angle relative to said housing when said latching assembly receives said end portion of said compartment cover.

4. The wireless communication device of claim 2, wherein said inner component shifts in a parallel direction relative to said housing when said latching assembly releases said end portion of said compartment cover.

5. The wireless communication device of claim 1, wherein said latching assembly includes a spring mechanism for biasing said latching assembly away from said housing.

6. The wireless communication device of claim 5, wherein said spring mechanism is subjected to a partial compression when said latching assembly receives said end portion of said compartment cover.

7. The wireless communication device of claim 6, wherein said spring mechanism is subjected to a substantial compression when said latching assembly releases said end portion of said compartment cover, and said substantial compression is greater than said partial compression.

8. The wireless communication device of claim 5, wherein:

said latching assembly includes an inner component, said spring mechanism being positioned against said inner component at a contact location;

said inner component directs a first force toward said contact location to releases said end portion of said compartment cover;

said inner component directs a second force toward a location offset from said contact location to receives said end portion of said compartment cover; and said first force is greater than said second force.

9. The wireless communication device of claim 8, wherein:

said inner component includes at least one protrusion extending from a particular location of said inner component, said particular location being offset from said contact location; and said end portion of said compartment cover subjects said second force to said at least one protrusion when said latching assembly receives said end portion.

10. The wireless communication device of claim 1, wherein said compartment is capable of receiving a removable module, said removable module being a power source.

11. The wireless communication device of claim 10, further comprising a transceiver circuit positioned in said housing, said power source being effective to provide electrical power to said transceiver circuit.

12. A wireless communication device comprising:

a housing having a compartment accessible from at least one side of said housing;

a compartment cover including an end portion, said compartment cover having a covering position over said compartment; and an inner component positioned adjacent to said housing and an outer component positioned adjacent to said inner component, said inner component being effective to move together with said outer component to release said end portion of said compartment cover and move separate from said outer component to receive said end portion of said compartment cover, said inner component requiring less interactive force to receive said end portion than to release said end portion.

13. The wireless communication device of claim 12, wherein said end portion of said compartment cover is effective to rotate said inner component to receive said end portion.

14. The wireless communication device of claim 12, wherein said inner component rotates to receive said end portion of said compartment cover, and said inner component shifts to release said end portion of said compartment cover.

15. The wireless communication device of claim 14, wherein said inner component rotates separate from said outer component when said inner component receives said end portion of said compartment cover.

16. The wireless communication device of claim 14, wherein said inner component shifts together with said outer component when said inner component releases said end portion of said compartment cover.

17. The wireless communication device of claim 12, further comprising a spring mechanism for biasing said inner component away from said housing.

18. The wireless communication device of claim 17, wherein said spring mechanism is subjected to a partial compression when said inner component receives said end portion of said compartment cover.

19. The wireless communication device of claim 18, wherein said spring mechanism is subjected to a substantial compression when said inner component releases said end portion of said compartment cover, and said substantial compression is greater than said partial compression.

20. The wireless communication device of claim 17, wherein:

said spring mechanism is positioned against a contact location of said inner component;

said inner component and said outer component direct a first force toward said contact location to releases said end portion of said compartment cover;

said inner component directs a second force toward a location offset from said contact location to receives said end portion of said compartment cover; and said first force is greater than said second force.

21. The wireless communication device of claim 20, wherein said inner component includes at least one protrusion extending from a particular location of said inner component, said particular location being offset from said contact location; and said end portion of said compartment cover subjects said second force to said at least one protrusion when said inner component receives said end portion.

22. The wireless communication device of claim 12, wherein said compartment is capable of receiving a removable module, said removable module being a power source.

23. The wireless communication device of claim 12, further comprising a transceiver circuit positioned in said housing, said power source being effective to provide electrical power to said transceiver circuit.

* * * * *